United States Patent [19]
Hayward

[11] 3,870,063
[45] Mar. 11, 1975

[54] MEANS OF TRANSPORTING CRUDE OIL THROUGH A PIPELINE

[76] Inventor: John T. Hayward, 122 Bayside Dr., Clearwater, Fla. 33515

[22] Filed: June 11, 1971

[21] Appl. No.: 152,196

[52] U.S. Cl............... 137/13, 62/55, 48/190, 166/267
[51] Int. Cl............................................. F17d 1/16
[58] Field of Search....... 62/55; 48/190, 191; 137/1, 137/13; 166/DIG. 1, 267

[56] References Cited
UNITED STATES PATENTS

| | | | |
|---|---|---|---|
| 1,762,423 | 6/1930 | Scharpenberg | 48/190 X |
| 1,942,131 | 1/1934 | Baumann et al. | 48/190 X |
| 2,168,306 | 8/1939 | Schutte | 137/13 X |
| 3,269,401 | 8/1966 | Scott et al. | 137/13 |
| 3,473,542 | 10/1969 | Chu et al. | 137/13 |
| 3,519,006 | 7/1970 | Simon et al. | 137/13 |
| 3,548,846 | 12/1970 | Allen | 137/13 |
| 3,650,119 | 3/1972 | Sparling | 62/55 |
| 3,675,671 | 7/1972 | Sweeney et al. | 137/13 |

Primary Examiner—Meyer Perlin
Assistant Examiner—Ronald C. Capossela
Attorney, Agent, or Firm—Martin J. Skinner

[57] ABSTRACT

A means of transporting crude oil through a pipeline from a transmission station, such as a producing area, to a receiving station, in which the crude oil is not economically pumpable through the environment in which the pipeline passes, including adding a pour point depressant to the crude oil at the transmission station to maintain pumpability of the crude oil throughout the length of the pipeline, extracting the pour point depressant from the crude oil at the receiving station, and transporting extracted pour point depressant back to the transmission station, such as by means of a second pipeline.

4 Claims, 4 Drawing Figures

INVENTOR.
JOHN T. HAYWARD 3,870,063

MEANS OF TRANSPORTING CRUDE OIL THROUGH A PIPELINE

BACKGROUND OF THE INVENTION

This invention relates to the art of transporting crude oil through a pipeline system which is designed to deliver commercial quantities of crude oil from a producing area to a distant market. The transportation of materials by pipeline where applicable can be substantially more economical than the corresponding transportation by rail or other means by virtue of simplicity of operation and high degree of automation characteristic of pipeline transportation. This has resulted in extensive application of pipeline procedures to the movement of crude oil from areas in which it is produced to areas in which it can be refined, marketed and consumed. However, in the present state of the art these applications have been limited to situations in which the crude oil to be transported has a relatively high fluidity, that is, a low viscosity and low pour point in the environment in which the pipeline exists. It should therefore be noted that the novel features of this invention are particularly directed to such situations in which crude oil extracted from the ground has a high viscosity in the environment through which the pipeline passes, such as very cold ambient temperatures, wherein it may not be readily pumpable through a pipeline over substantial distances in considerable volume utilizing known and presently practiced techniques.

Producing areas potentially yielding large quantities of crude oil have been recently discovered in the Arctic regions of Canada and in the North Slope of Alaska. It is contemplated that these discoveries will initiate profound changes in the North American Arctic. To exploit these vast resources efforts are being made to construct and operate pipelines for transporting the crude oil from these remote and uninhabited producing areas to more accessible locations in which oil can be readily marketed and/or from which it can be easily conveyed to farther destinations through conventional transportation means.

However, a major difficulty in the above undertaking is the low temperature of the area through which the crude oil must be passed, and the effect on the environment and the possible threat to the ecology of the Artic if present methods are practiced. Conservationalists have expressed considerable concern over the consequences of proposed developments, and recently stringent requirements have been imposed by the U.S. Government in order not to damage the ecology of what is considered to be the America's last great, untouched wilderness area. Despite the eagerness of oil companies which have already invested many hundreds of millions of dollars in the North Slope oil and gas leases of Alaska, all the factors, both technical and environmental, are being carefully weighed by a Federal Task Force which includes several agencies of the U.S. Government, and has been established by Secretary of the Interior Walter J. Hickel on Apr. 18, 1969.

There is a considerable controversy at the present time between oil companies and the U.S. Government over the proposed Trans Alaska Pipeline System (TAPS) for transporting oil over a distance of 800 miles from the Alaskan North Slope to the south Alaskan seaport of Valdez. The main issue involved is the ecology of the Arctic. It should be noted that the crude oil extracted from the ground cannot be easily handled through pipelines by normal pumping means because of the low temperatures to which the pipeline is exposed. Consequently, plans have been suggested to install special heating units in the pumping stations along the route of the pipeline. It is contemplated that oil heaters at such pumping stations would burn night and day in order to bring the temperature of the crude oil up to about 100° F at each pumping station so that the temperature would not fall below 10° F before reaching the next pump station to maintain pumpable fluidity of the crude oil. However, this creates a difficult problem of erosion of the surrounding permafrost through heat. A hot pipeline buried in the ground would thaw the surrounding permafrost, including its thick ice lenses. The results could be disastrous. Differential settling, where the unequal melting of permafrost causes different stresses along the length of the pipeline could rupture it, spilling millions of gallons of oil over the land. Or the heat can exacerbate the natural process of solifluction, the slow creep of earth down the slope. The result could be a massive land flow that could break the pipe, as well as alter topography.

Furthermore, should the heaters in a pipeline utilized in a cold environment stop functioning, due to breakdown or other reason, temperature of fluid in the pipeline will fall and viscosity will rise with resulting considerably higher pressure required to restart flow again. These malfunctions of the pipeline system can be particularly troublesome at low ambient temperatures which in the Arctic regions may be as low as minus 65° F.

Many efforts have been made to solve the above difficulties and to reduce the potential threat to ecology. It has been suggested to elevate above the ground about 40 miles of the proposed Trans Alaska pipeline to avoid thawing and erosion of permafrost in those places in which the consequences would be the most serious. However, the concern over the possible damage to environment is so great that conservationists and U.S. Government officials now believe that as much as 400 to 600 miles of the pipeline should be laid over the ground on stilts above the sensitive permafrost. (See "Changing Design for TAPS" in *Science News*, 97, May 2, 1970, p. 432). The disadvantages of such an arrangement are abvious.

OBJECTS OF THE INVENTION

It is a general object of my intent to provide improved means of transporting crude oil through a pipeline passing through a low temperature environment.

Another object of my invention to provide a means and a method for economically increasing the fluidity of petroleum, whereby it may be readily pumped through a conventional pipeline passing through a low temperature environment in an economical and efficient manner.

A more particular object of my invention is to provide a pipeline means for transportation of crude oil through a low temperature environment including means of maintaining sufficient fluidity of the crude oil that pumpability is preserved throughout the length of the pipeline and at the same time maintaining the temperature of the crude oil sufficiently low that the area through which the pipeline passes is not deleteriously affected.

Other objects and advantages will be apparent from the accompanying description and claims taken in conjunction with the accompanying drawings.

DESCRIPTION OF VIEWS

It should be noted that elements which perform the same functions are labelled in these figures by the same numerals.

SUMMARY OF THE INVENTION

Figure 1:
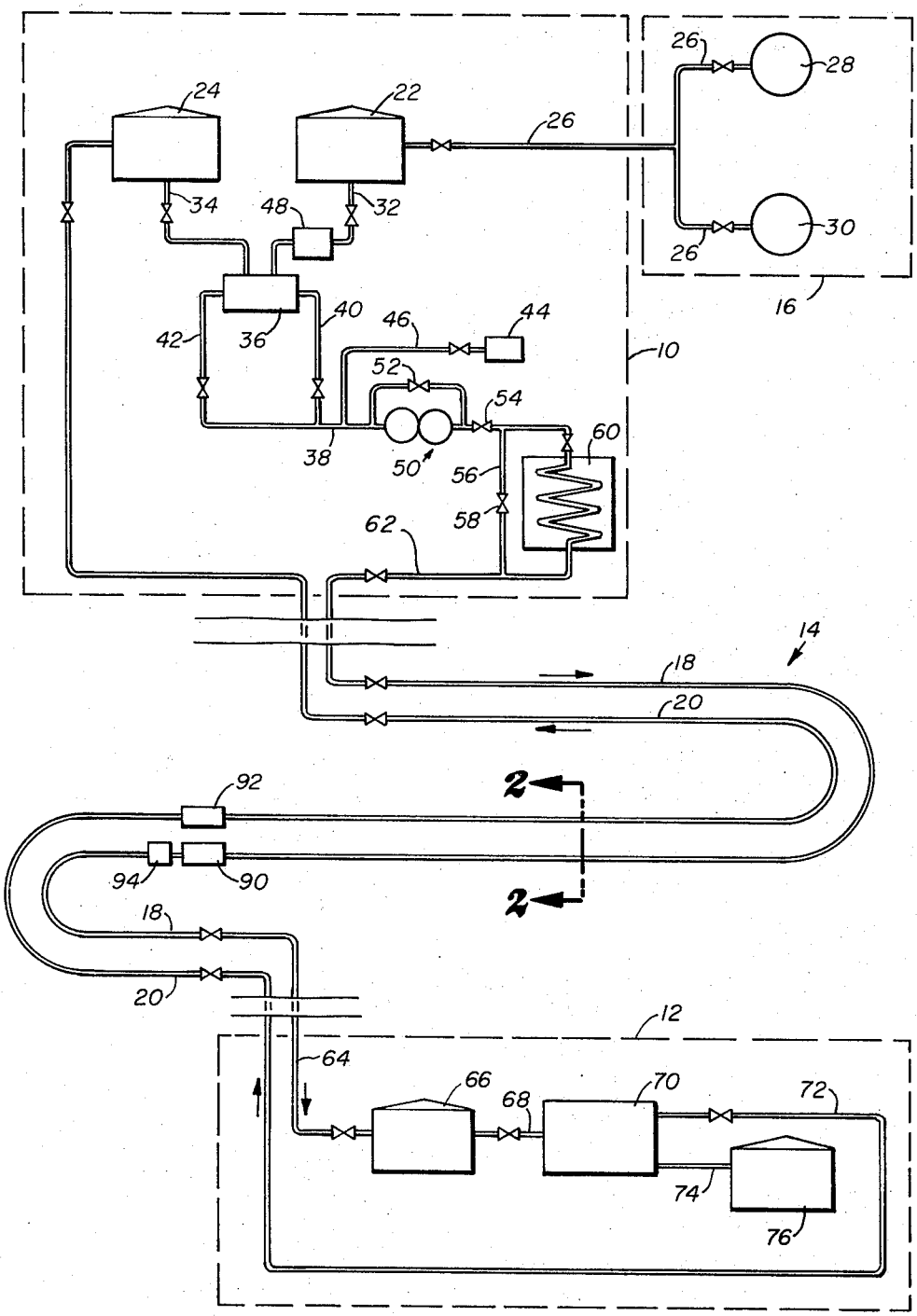
FIG. 1 shows schematically as general layout for practicing the invention.

It is understood that the means of my invention are not limited to the particular arrangement shown in the drawings. Moreover, the teachings of my invention are not solely confined to the problems which are relevant to Arctic regions of Canada and Alaska. Situations in which high viscosity oil extracted from the ground is in such condition that it may not be readily pumpable through pipelines that have been found in other parts of the world, as in Venezuela (*Oil and Gas J.*, 57, Nov. 9, 1959, pp 172, 174, 178), in Australia and in Italy (*Oil and Gas J.*, 64, Oct. 3, 1966, pp 117-122). In these areas the "low temperature environment" through which the crude oil is to be pumped may be a temperate or even tropical zone, geographically, but nevertheless, temperatures are encountered in which the characteristics of certain crude oil is such that the crude cannot be readily pumped through pipelines using normal procedure, as presently generally practiced in the petroleum industry. In that connection extensive heating arrangements to reduce viscosity have been proposed. The principles of my invention can be applied whenever there is a need for transporting crude oil over large distances and in considerable volume.

According to this invention crude oil having high viscosity or a high pour point is blended at a transmission station, such as at a producing area, with an appropriate pour paint depressant or thinning substance to produce a blend having reduced viscosity which is then efficiently pumpable and thus economically transmittable through a pipeline to a distant receiving station. At the second station the pour point depressant, or thinner, is extracted from the blend and conveyed in reverse flow to the transmission station by means of a second pipeline and used over again for blending with additional quantities of crude oil, thereby repeating the cycle.

DETAILED DESCRIPTION

To accomplish the objectives of my invention I provide in FIG. 1 a combination comprising three distinct basic portions: a transmission station 10, a receiving station 12, and a pipeline system 14 for connecting the two stations. The transmission station is typically adjacent to or is located within an oil producing area 16 which may be in a remote and relatively inaccessible location, as in the Arctic region of North America. The receiving station 12 is typically in a populated area having conventional transportation facilities available to industrial regions and is typically hundreds of miles distant from the transmission station 10 and the producing area 16.

The crude oil extracted in the producing area 16 may be of a low, normal, or high viscosity. This invention is applicable regardless of the pour point of the crude oil if such pour point will render the crude oil not economically pumpable in the environment which pipeline system 14 traverses. As previously indicated, even when the pipeline system 14 is entirely contained in a temperate or even tropical area, the pour point of some crude oil is so high that it cannot be efficiently pumped. This is a rather unusual or rare condition although it does occasionally occur. A more common condition is that encountered when pipeline system 14 must pass through low temperature regions, such as in the Arctic areas of North America. In these conditions much crude oil, which has a normal or typical pour point range and would be easily pumpable in temperate zones becomes not economically pumpable due to the fact that the pipeline in which the crude is to be transported is in a very cold ambient temperature. In some Arctic regions the conditions to which pipelines may be exposed result in temperatures falling to the range of $-40°$ to $-60°$ F.

To reduce viscosity I blend the crude oil in the transmitting station with pour point depressant, a typical example being gasoline or any other form of light petroleum to obtain a blend, the viscosity of which is lower than that of the crude oil. The process has some analogy to that involving the use of a thinner to be mixed with paint in order to render it more liquid. Therefore, for the purposes of this invention the gasoline or any other suitable substance to be mixed with crude oil will be termed a "pour point depressant." At the same time the mixture of crude petroleum with the pour point depressant will be termed "blended petroleum." It is apparent that because of reduced viscosity such blended petroleum is more amenable to flow than the crude oil in its original form. Therefore it can be more easily handled by normal pumping means and conveyed to the receiving station 12.

At the receiving station I provide a means for extracting the pour point depressant from the blended petroleum by distillation or any other suitable process leaving a residual oil which can be processed, or which can be forwarded through conventional transportation facilities to other destinations. The extracted pour point depressant is then transported back to the transmission station for blending with additional crude oil from producing area 16. In such a manner the pour point depressant is used over and over again to reduce viscosity of the crude oil which is being continually withdrawn from the producing area.

The pour point depressant or thinner as used to initially activate the system and that which is extracted at receiving station 12 may be transported to first station 10 in a variety of ways, such as by truck or ship. A preferred manner of transporting the extracted pour point depressant back to the transmission station, is by means of a return pipeline. To this end pipeline system comprises conventional pumping facilities and two pipelines: main line 18 for moving the blended petroleum from the transmitting to the receiving station and return line 20 for moving the pour point depressant from the receiving to the transmitting station. Both pipelines 18 and 20 may be buried in the same ditch and run parallel to each other. In another embodiment a single pipeline is used for first moving the blended petroleum towards the receiving station and subsequently moving the pour point depressant in reverse flow towards the transmitting station; an embodiment, while physically possible to accomplish, is not desirable because of inefficiencies it introduces.

Referring now more specifically to FIG. 1, there are shown two tanks, 22 and 24, adjacent one to another and located at the transmitting station 10. The tank 22 is used for storage of crude oil and is, therefore, connected by means of a valved pipe system 26 with two producing wells, 28 and 30. Tank 24 is used for storage of the pour point depressant, such as gasoline or other light hydrocarbon to be used as a thinner. Valved supply pipes 32 and 34 lead from the tanks 22 and 24, respectively, to a proportioning pump 36 by which predetermined proportions of crude oil and pour point depressant are supplied to the main supply line 38 through separate supply lines 40 and 42. Other suitable substances such as rust inhibitors, anti-foaming agents, detergents, etc., useful for blending purposes may also be introduced into the main supply line 38 from a suitable source 44 by means of a pipe 46. The proportioning pump can be readily adjusted for various ratios and it is possible by valve control to shut off the supply line from the source 44.

DEWAXING

As an alternate arrangement a dewaxing stage 48 may be employed to treat the crude oil from tank 22 before it enters the proportioning pump 36. The pour point of crude oil is determined by several characteristics, but a primary determinate is the amount and type of wax in the crude. In order to prepare some crudes for transportation through a pipeline system traversing cold environments, it may be expedient to remove portions of the wax content, thereby reducing the amount of pour point depressant required to reduce the crude oil pour point to that at which the crude can be economically pumped. Several means exist for dewaxing crude oil, some of which are discussed in *Petroleum Refinery Engineering*, by W. L. Nelson, Published by McGraw-Hill Book Company, Inc., 1958, at pages 374 through 394.

In a preferred operation the crude oil and the pour point depressant are simultaneously withdrawn from the tanks 22 and 24, respectively, in the desired proportionate amounts and discharged together into a mixer stage 50. The mixing may be accomplished by any means well known in the art whereby the mixture of crude oil and the pour point depressant is agitated until a homogeneous blend is obtained. The proportion of the crude oil and of the pour point depressant is of course determined by the conditions present in any particular case to provide a blend the viscosity of which is lower than that of the crude oil. The ratio required will depend upon such factors as: (a) the characteristics of the crude oil; (b) the type of pour point depressant utilized; and, (c) the minimum temperature to which the mixture is to be exposed in the pipeline system. Required ratios of hydrocarbons having different pour points to obtain a blend having the desired pour point may be accomplished utilizing information set out in textbooks on the subject, such as *Petroleum Refinery Engineering*, pp. 139–141.

The commingling process in the mixer 50 should be very thorough. It can be accomplished by means of various forms of apparatus, such as pressure mixing valve or agitator, but I find that a rotary pump arranged for recirculation, as through a by-pass 52, is entirely satisfactory. In such apparatus, the net discharge through a spring loaded valve 54 is equal in volume to the quantity handled by the pump 36.

The blended petroleum withdrawn from the mixer 50 is discharged directly through line 56 and valve 58 to the pipeline system 14. An alternate arrangement includes passing the blended crude oil into a cooler 60 wherein its temperature is reduced to a desired level.

In some geographical areas, such as in the Artic areas of North America, pipeline system 14 may be built on or buried in permafrost terrain. In such terrain an area of heat can cause melting or thawing of the permafrost. Such can cause serious consequences, and can possibly cause the pipeline system, by the effect of its weight, to sink to great depths, resulting in failure of the line. If such should occur, oil spills might result from the ruptured line, and, in addition, the pipeline might sink to a depth where it could not be economically repaired and consequently would have to be abandoned. In any event, and irrespective of the economic consequences, it is deemed most desirable to build and operate pipeline systems in a way to have the minimum effect on alteration of the environment in which they are situated.

For these reasons it will be desirable in some geographical areas that the temperature of the pipeline system be kept below a level which will influence the environment. In the permafrost area the temperature should be kept below the freezing point of water so that the pipeline system cannot become a factor in the alteration of the condition of the permafrost. For this reason, cooler 60 may be employed to insure that blended crude oil enters the pipeline system 14 at a temperature low enough as not to affect the environment through which the pipeline system traverses. Whether directly through line 56, or through cooler 60, the blended crude is conveyed via line 62 to the main pipeline 18 and thus transmitted through pipeline system 14 to the receiving station which may be at a distance of up to hundreds of miles.

At the receiving station 12, the blended petroleum is withdrawn from the main pipeline 18 through a valved pipe 64, stored in a tank 66 and subsequently conveyed through a valved line 68 to a separator 70. In separator 70 the pour point depressant, or at least a substantial portion thereof, is extracted from the blended crude oil. In the preferred form of my invention in which the pour point depressant is a light hydrocarbon, the separator 70 consists of a standard distillation system in which vaporization, fractionation, condensation, and cooling are performed. In this operation one typically obtains from the blended petroleum a light condensate discharged through the pipe 72 and a heavy condensate discharged through the pipe 74. A detailed description of all the relevant processes can be found in any of the well-known textbooks as in "Petroleum Refinery Engineering" by supra. It should be understood that in an alternate arrangement a cracking process as described in this textbook can be used for the purposes stated.

The light hydrocarbon obtained from the separator 70 has the same composition as the pour point depressant used for blending the crude oil. This material is then, in the preferred arrangement of the invention, moved through the valved line 72 to the pipeline system 14 wherein it is conveyed by means of the return line 20 to the transmitting station 10. At the transmitting station the pour point depressant, e.g., light hydrocarbon such as propane or butane is stored in the tank 24 and is used for blending with crude oil from the wells 28 and 30. In such a manner the pour point depressant may be used over and over again. During this process the produced crude oil is continually withdrawn from the separator 70 at the receiving station 12 and is discharged into tank 76. This crude oil, which represents the residue oil obtained by removing the pour point depressant from the blended petroleum, is then conveyed to a refinery or to conventional transportation means for utilization at other destinations.

Figure 2:
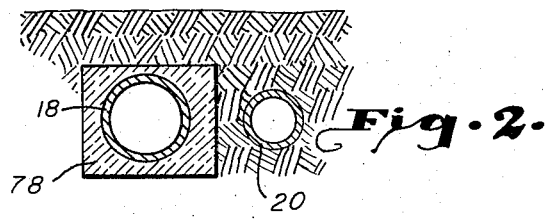
FIG. 2 is a cross-sectional view of a pipeline system which may be used to practice my invention, taken along the line 2—2 of FIG. 1.

It should be noted that the main pipeline 18 for moving the blended oil and return pipeline 20 for moving the pour point depressant can be constructed in proximity parallel one to another and can be located in the same ditch. In some applications it may be desirable to maintain pipeline 18 at a temperature above ambient, in which case pipeline 20 should not be sufficiently close to conduct heat away from pipeline 18. Return pipeline 20 may operate at ambient. If necessary, pipeline 18 can be encapsulated in insulation 78, as shown in FIG. 2.

Figure 3:
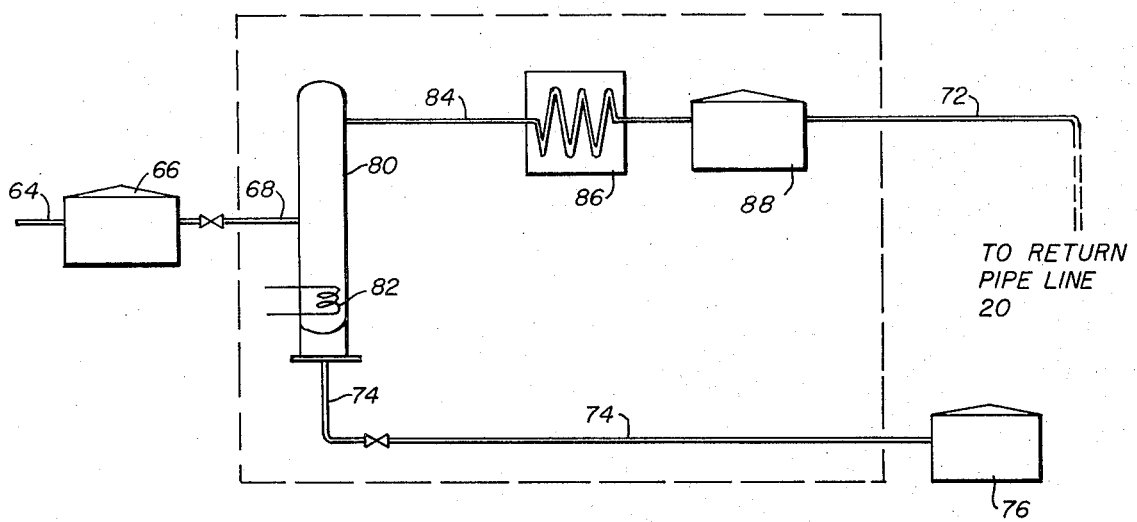
FIG. 3 shows schematically a portion of FIG. 1 showing some details of one embodiment of the separator element of FIG. 1.

FIG. 3 shows schematically a portion of the arrangement of FIG. 1 which comprises the separator 70 and illustrates by way of example, a simplified structure of one type of separator which may be employed when the pour point depressant is a light hydrocarbon. As shown specifically in this figure, the blended petroleum withdrawn from the tank 66 is conveyed to a still 80 which is heated such as by a means 82. The solvent vapors are removed from still 80 through line 84 and are conveyed after suitable liquifaction, as by chilling in 86, to a storage tank 88 and then delivered through the lines 72 and 20 to the tank 24 in the transmitting station 10. At the same time residual oil is withdrawn from still 80 through line 74 and stored in tank 76.

It is now apparent that by means of the arrangement shown in FIG. 1, high pour point crude oil which is normally impumpable or difficultly pumpable through pipes may be easily and economically conveyed over considerable distances with conventional pumping equipment. At distances of many miles it may be desirable to use one or more booster pumps 90 spaced along the line in order to maintain the flow of blended petroleum in the pipeline 18 at a desired velocity. Similarly, one or more booster pumps 92 spaced along pipeline 20 would facilitate the flow of the pour point depressant from the receiving to the transmitting station. In some instances it may also be desirable to install a heater 94 at each pump 90 in order to maintain the temperature of the blended petroleum line 18 above a desired minimum. As previously indicated, in permafrost locations the temperature of the fluid in pipelines 18 and 20 is preferably kept below 32° F. It should, however, be noted that under the principles of this invention the use of heaters is optional and not mandatory. By mixing the crude oil with the pour point depressant I can reduce the viscosity of the blended petroleum to such a level that it can be moved in a pipeline by means of conventional pumping equipment at ambient temperatures. The use of heaters 94 may be employed as a means of reducing the quantity of pour point depressant required. By eliminating the heaters altogether the safety and reliability of the system will be enhanced however, and many of the problems of the environmental significance need not to be considered.

Figure 4:
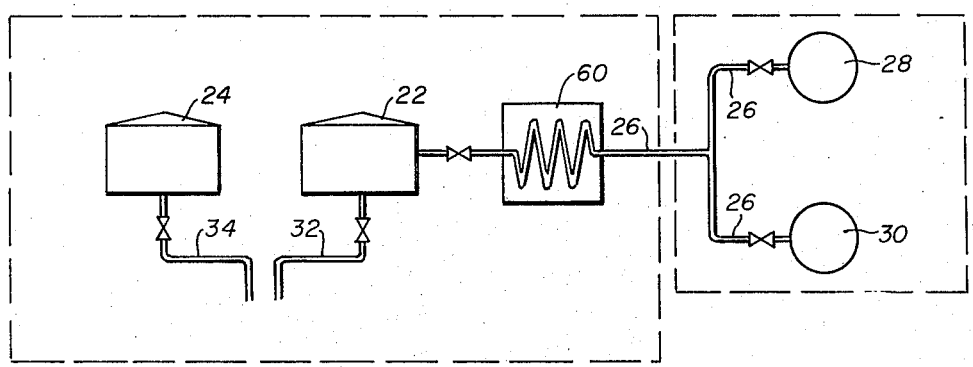
FIG. 4 illustrates a modified portion of FIG. 1 in which an appropriate cooling system has been provided to reduce the temperature of the crude oil at the output of the wells.

In the recently discovered oil fields in the Prudhoe Bay in the Northern Slope of Alaska, oil comes from the ground at a relatively high temperature which is of the order of 180° F. In such cases the blended petroleum discharged from the mixer 50 may be too hot for the transmission through pipeline 18 if it is buried in the permafrost, as previously discussed. The blended petroleum withdrawn from the mixer 50 may therefore be passed through cooler 60 whereby its temperature is reduced to a desired level as shown in FIG. 1. In an alternative arrangement, shown in FIG. 4, cooler 60 is placed directly at the output of the wells 28 and 30 thereby cooling the hot crude oil before it enters the tank 22.

The essence of the invention includes a means of transporting crude oil which is not economically pumpable in the environment through which it is to be transported, in a manner to least interfere with the environment and ecology through which the crude oil is moved. While a variety of chemicals and compounds may be used as a pour point depressant, the use of light petroleum hydrocarbons has many advantages. First, such material is directly available from the crude oil itself. Only that which is required for start-up would have to be supplied from another source. Second, light hydrocarbons are completely and easily blended with crude oil. Third, make up of unrecovered pour point depressant is not a factor since the lighter hydrocarbon is taken directly from the blended petroleum once the system is in operation. While many of the lighter hydrocarbons may be utilized, gasoline is plentifully available from most crude oil and is a good example of a pour point depressant applicable to the apparatus and system herein described.

Receiving station 12 has been described as it particularly functions to separate the pour point depressant from the blended petroleum for return to the transmission station. In one means of practicing the invention the receiving station 12 may be a refinery, in which, lighter hydrocarbons, such as gasoline, are extracted from the blended petroleum. In this case, only a portion of the extracted lighter hydrocarbon would be pumped through return line 20 back to the transmission station. Thus, in a sense the pour point depressant is recycled, but in another there is no distinction between that used to blend with the crude oil and that refined out of the blended petroleum and returned to the transmission station.

The operation of the system requires balancing of the various parameters, including the quantity and type of pour point depressant utilized, the dewaxing or not of the crude oil at the transmission station, and the employment of heaters along the pipeline, all of which will depend upon the characteristics of the crude oil, the environment in which the pipeline is to be laid, the degree of care to be exercised in avoiding effect on the environment, and finally, upon economics considerations.

It is to be understood that the above description is merely illustrative of preferred embodiments of my invention of which many variations may be made within the scope of the following claims by those skilled in the art without departing from the spirit of my invention. The invention is not limited to the embodiments set forth herein for purposes of exemplification, but is to be limited only by the scope of the attached claim or claims, including the full range of equivalency to which each element or step thereof is entitled.

What is claimed is:

1. A method of transporting crude oil through a pipeline from a transmission station, such as a crude oil producing area, to a receiving station, such as a refinery, wherein an adverse pipeline environment normally prevents economic pumping because of a high viscosity of the crude oil, which comprises:

pumping a light petroleum distillate from the receiving station to the transmission station through a first pipeline traversing the adverse environment;

intimately mixing the light petroleum distillate with crude oil at the transmission station in an amount sufficient to produce a blended petroleum having a viscosity suitably low for preserving pumpability of the blended petroleum at conditions of the adverse environment; and pumping the blended petroleum from the transmission station to the receiving station through a second pipeline in a direction countercurrent to the light petroleum distillate.

2. The method of claim 1 further comprising separating the light petroleum distillate from the blended petroleum at the receiving station and pumping the separated light petroleum distillate into the first pipeline.

3. A method of transporting large volumes of crude oil through a lengthy pipeline system from a transmission station to a receiving station wherein high viscosity of the crude oil normally prevents economic pumping, which comprises:

intimately mixing a light petroleum distillate with the crude oil at the transmission station in an amount sufficient to produce a blended petroleum having a viscosity suitably low for preserving pumpability of the blended petroleum throughout the length of the pipeline system;

pumping the blended petroleum from the transmission station to the receiving station through a first pipeline;

extracting the light petroleum distillate from the crude oil at the receiving station by heating the blended petroleum and collecting the separated light petroleum distillate; and pumping the recovered light petroleum distillate from the receiving station to the transmission station through a second pipeline.

4. The method of claim 3 wherein the light petroleum distillate is a light liquid product of fractional distillation of crude oil.

* * * * *